(12) United States Patent
Grassia et al.

(10) Patent No.: US 11,576,523 B2
(45) Date of Patent: Feb. 14, 2023

(54) STEAM WAND

(71) Applicant: BREVILLE PTY LIMITED, Alexandria (AU)

(72) Inventors: Robert Grassia, Summer Hill (AU); Chiu Keung Kenneth Lee, St Leonards (AU); Nicholas McColl, Randwick (AU); Con Psarologos, Bardwell Valley (AU)

(73) Assignee: BREVILLE PTY LIMITED, Alexandria (AU)

( * ) Notice: Subject to any disclaimer, the term of this patent is extended or adjusted under 35 U.S.C. 154(b) by 0 days.

(21) Appl. No.: 17/241,061

(22) Filed: Apr. 27, 2021

(65) Prior Publication Data

US 2021/0338005 A1 Nov. 4, 2021

Related U.S. Application Data

(63) Continuation of application No. 16/060,858, filed as application No. PCT/AU2017/050195 on Mar. 7, 2017, now abandoned.

(30) Foreign Application Priority Data

Mar. 7, 2016 (AU) ................................ 2016900843

(51) Int. Cl.
*A47J 31/44* (2006.01)
(52) U.S. Cl.
CPC ................................ *A47J 31/4489* (2013.01)
(58) Field of Classification Search
CPC .... A47J 31/4489; A47J 31/4425; A47J 31/44; F16L 11/081; F16L 11/11; F16L 11/12
See application file for complete search history.

(56) References Cited

U.S. PATENT DOCUMENTS 2,915,089 A * 12/1959 Horsting, Sr. ............. E04C 5/10
384/42
3,402,741 A * 9/1968 Yurdin .................... F16L 11/12
446/374

(Continued)

FOREIGN PATENT DOCUMENTS

AU 2015202474 A1 11/2015
CN 102438490 A 5/2012

(Continued)

OTHER PUBLICATIONS

Third Examination Report for Australian Patent Application No. 2017231093, dated Feb. 4, 2020.

(Continued)

*Primary Examiner* — Jason L Vaughan
*Assistant Examiner* — Amanda Kreiling
(74) *Attorney, Agent, or Firm* — Quarles & Brady LLP

(57) ABSTRACT

A steam wand assembly for an espresso machine has features for preventing overheating of the tip of the steam wand. In a first aspect there is provided a steam wand device comprising a metallic main body tube, a steam hose that passes through the tube, the steam hose also passing through a flexible spacer that is within the tube. In a further aspect there is provided a steam wand device comprising a main body tube having a metallic primary tube and a metallic tip, the primary tube and the tip being attached to one another by a polymeric steam nozzle, the nozzle having a central bore that extends from an inlet adjacent to a lower end of a steam hose to an exit opening.

9 Claims, 17 Drawing Sheets

(56) References Cited

U.S. PATENT DOCUMENTS

| | | | | |
|---|---|---|---|---|
| 3,473,575 A | * | 10/1969 | Herbert | F16L 59/125 |
| | | | | 174/29 |
| 3,592,238 A | * | 7/1971 | Scheffler | F16L 59/125 |
| | | | | 174/29 |
| 2002/0079010 A1 | | 6/2002 | Marchal | |
| 2004/0231528 A1 | | 11/2004 | Paoletti et al. | |

FOREIGN PATENT DOCUMENTS

| | | | |
|---|---|---|---|
| CN | 104799698 A | 7/2015 | |
| CN | 107920682 A | 4/2018 | |
| DE | 7924687 U1 | 4/1984 | |
| EP | 0 662 579 B1 | 3/1998 | |
| EP | 2898802 A1 | 7/2015 | |
| EP | 3 469 964 A1 | 4/2019 | |
| JP | 2012092962 A | 5/2012 | |
| JP | 5697352 B2 | 4/2015 | |
| WO | WO-2010/121299 A1 | 10/2010 | |
| WO | WO-2010121299 A1 * | 10/2010 | A47J 31/4489 |
| WO | WO-2016/154662 A1 | 10/2016 | |

OTHER PUBLICATIONS

Second Office Action for Chinese Patent Application No. 201780004999.9, dated Jul. 5, 2021.
International Search Report and Written Opinion for PCT/AU2017/050195, dated Apr. 19, 2017.
Examination Report for Australian Patent Application No. 2017231093, dated Mar. 8, 2019.
Extended European Search Report for European Patent Application No. 17762325.3, dated Jul. 1, 2019.
First Office Action issued in Chinese Patent Application No. 201780004999.9, dated May 11, 2020.
Notice of Acceptance for Australian Patent Application No. 2017231093, dated Mar. 2, 2020.

\* cited by examiner

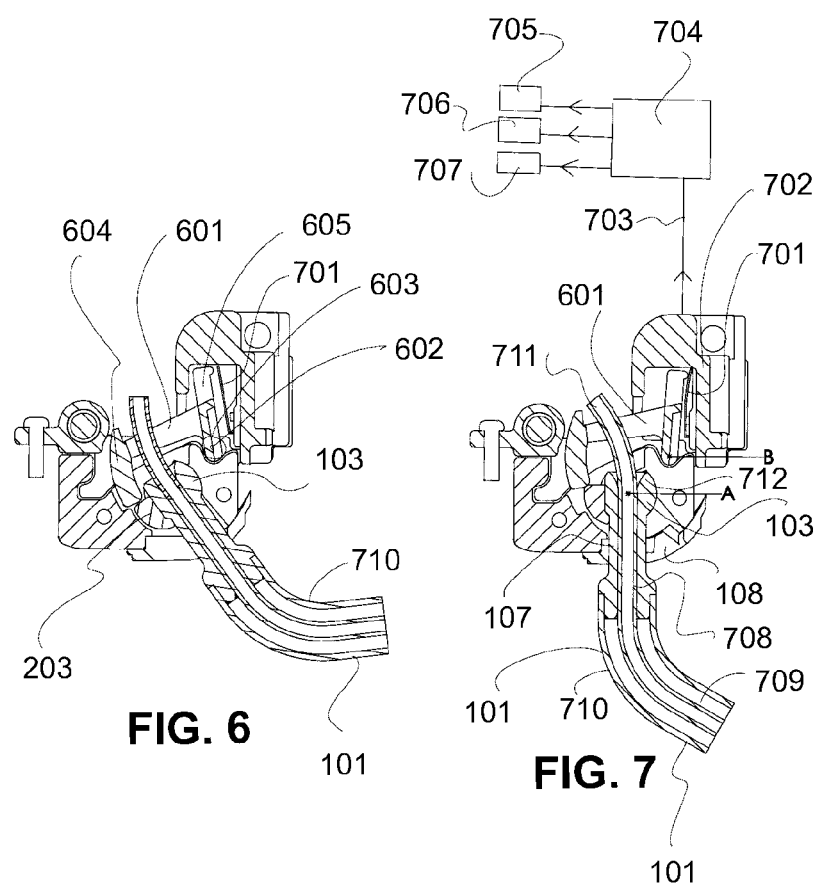

STEAM WAND

FIELD OF THE INVENTION

The invention relates to an apparatus for steaming beverages and more particularly to a steam wand that is attached to a device with a steam boiler such as an espresso making machine.

BACKGROUND OF THE INVENTION

The present invention provides a variety of alternatives and improvements to conventional steam wand technology.

OBJECTS AND SUMMARY

It is an object of the invention to provide a steam wand or steam wand assembly with improved performance benefits, or new functionality, or safety features.

Accordingly, there is provided a steam conveyor or steam wand assembly that is supported by a ball joint but guided to achieve a restricted range of motion in a home position.

In other embodiments of the invention a steam wand assembly that cooperates with a switch that provides location information to a controller. The controller may use the location information for a variety of purposes such as initiating a steam purge cycle, preventing unsafe use of the steam wand or providing display information.

In other embodiments of the invention, the steam wand comprises an internal hose that carries steam to a tip of the steam wand. Improvements prevent the hose from transferring heat to the main body tube, by avoiding contact with the interior side wall of the wand assembly.

In further embodiments of the invention, a steam wand is biased to return to a home position, the bias force that accomplishes same being resisted by a dampener that regulates the speed at which the wand returns to the home position.

BRIEF DESCRIPTION OF THE DRAWING FIGURES

In order that the invention be better understood, reference is now made to the following drawing figures in which:

FIG. 1 is a perspective view of a steam wand assembly and support fixture.

FIGS. 2(*a*)-(*c*) illustrate the movement of the neck of a steam wand within its guide.

FIGS. 3(*a*)-(*c*) illustrates the engagement and disengagement of a steam wand ball fin into a co-operating slot.

FIG. 6 is a cross-sectional view of a steam wand, switch and switch actuator.

FIG. 7 is a cross-sectional view of a steam wand, switch and switch actuator.

DETAILED DESCRIPTION

Figure 1:
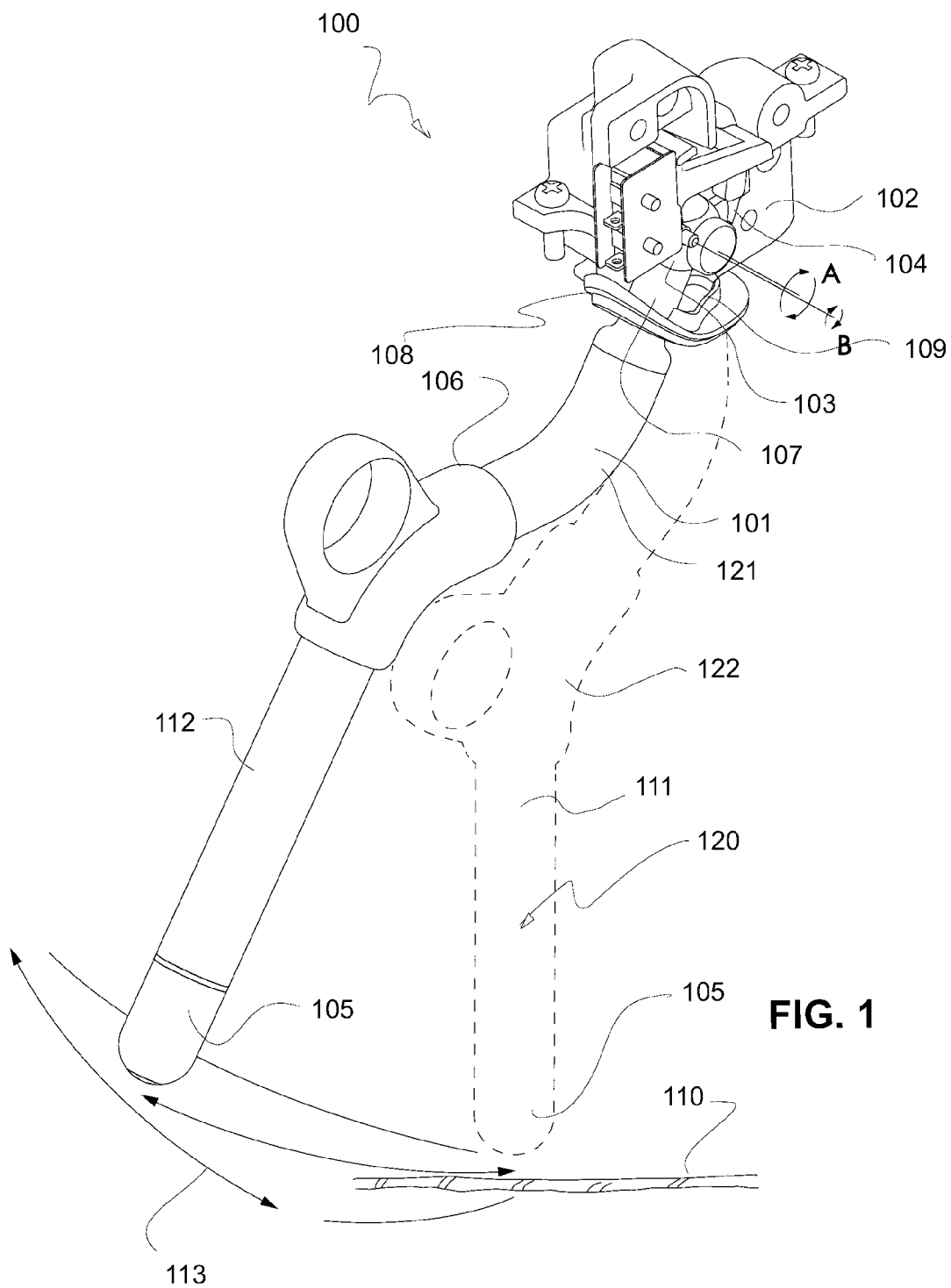

As shown in FIG. 1, a steam wand assembly 100 includes a steam wand 101 that is retained by a support fixture 102. The wand may be articulated or stationary. The wand has a main body tube 120 that may be formed from one or multiple sections. Because the main body tube is generally metallic and steam passes through it, it is an advantage to insulate the tube from the steam. In this example, the steam wand 101 is articulated, having a ball 103 at one end that is received by a socket 104 that forms part of the support fixture 102. An opposite end of the wand is formed by a removable wand tip 105. The tip is formed, in part, from the main body tube. A ring-like handle 106 is located between the ball 103 and the tip 105. The wand may be straight or bent. The current example is bent in two locations 121, 122.

The ball 103 may be attached to or formed integrally with a neck 107 optionally having a smaller diameter than the remainder of the wand 101. In this example, the neck 107 passes through a guide 108 in which is formed an opening 109 through which the neck 107 extends.

As further shown in FIG. 1, the wand 101 has a home position 111. In the home position, the wand tip 105 is at its closest distance to the upper surface of the drip tray, grating or other support surface 110 of the device to which it is attached. The wand also has an extended position or position of normal use 112. In the extended position 112, the wand is free to move from side to side 113.

As shown in FIG. 2, the guide 108 determines the limits of movement of the neck 107 and therefore the wand 101. As shown in FIG. 2(*a*) the guide's opening 109 is generally triangular. Each of the three corners 201 are preferably radiused to conform to the external radius of the neck 107. In this example, the side edges 202 of the opening are convex, the middle of each side edge extending toward the centre of the opening 109. The front edge 203 is concave, its middle extending slightly away from the centre of the opening 109.

FIG. 2(*a*) represents the position of the neck 107 when in a home position. In the home position, the wand 101 is retracted to its maximum extent with respect to the device that supports the fixture 102. The home position is shown by the dotted line representation 111 in FIG. 1.

Figures 2A, 2B, 2C:
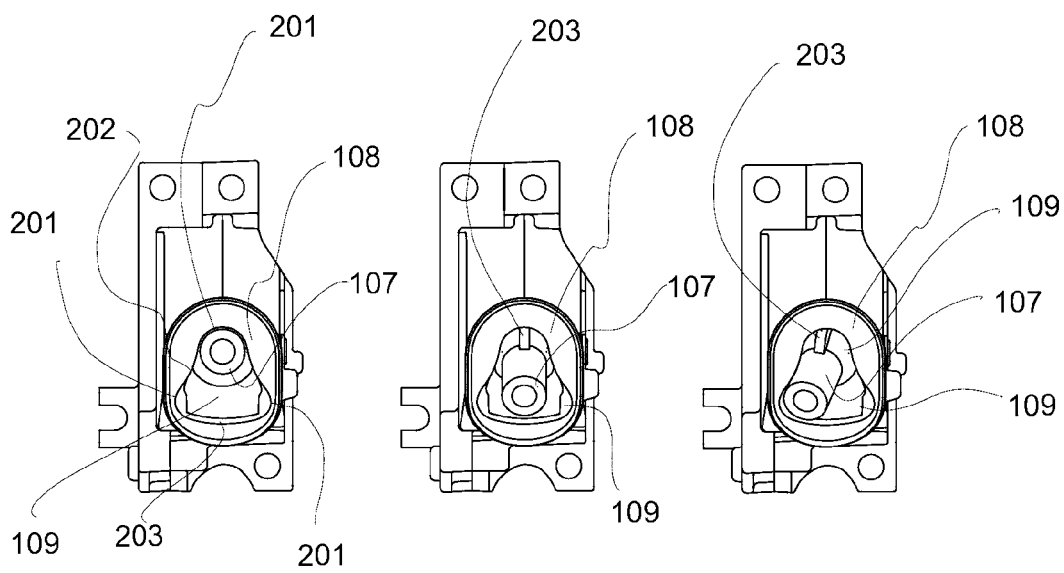

In some examples, the neck may be vertical or near vertical in the home position. In the home position, steam optionally passes through the wand only for the purposes of cleaning or purging it. In the home position, the wand tip 105 is at its closest point to the device's drip tray, grating or other supporting surface 110. FIGS. 2(b) and (c) represent the position of the neck with respect to the guide when the wand is in an extended position 112 (see FIG. 1). In the extended position, the neck and therefore the wand can be pivoted from side to side 113. The extension of the wand is limited by the contact of the neck against the front edge of the opening as shown in FIG. 2(c).

FIG. 2 also illustrates that the wand's ball 103 is provided with a guide fin 203, as will be explained.

Figures 3A, 3B, 3C:
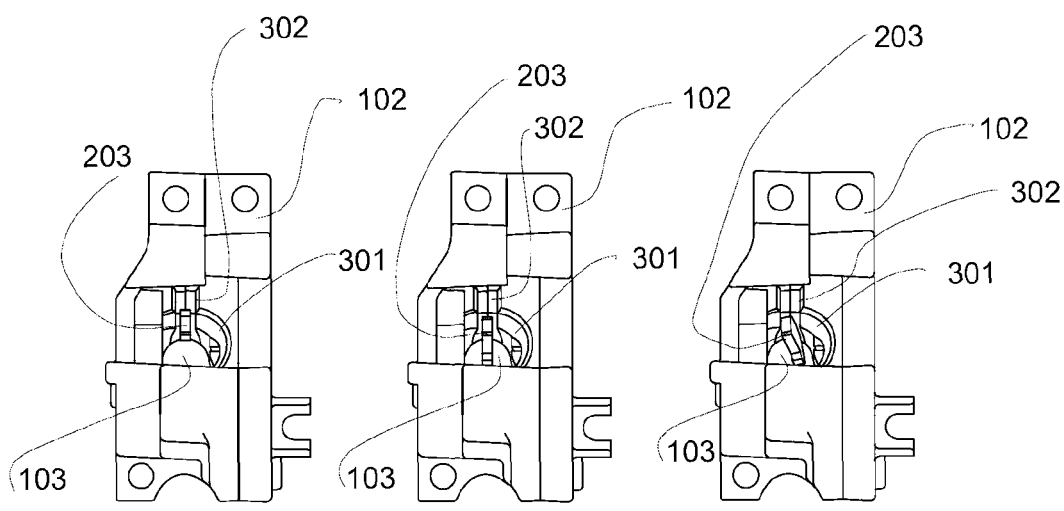
Figure 4:
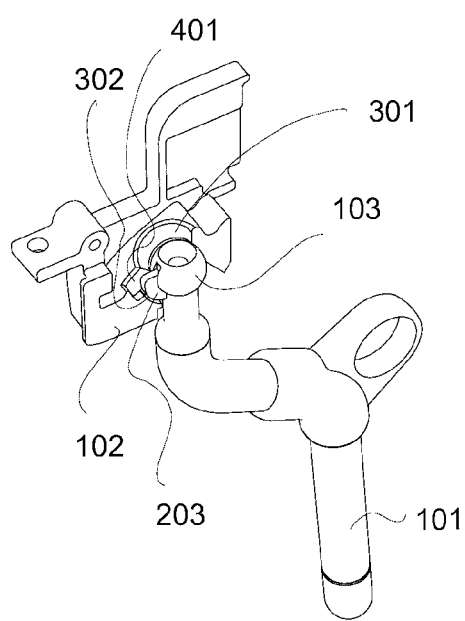
FIG. 4 is a perspective view, partially sectioned illustrating the engagement of a steam wand ball fin in a slot.
Figure 5:
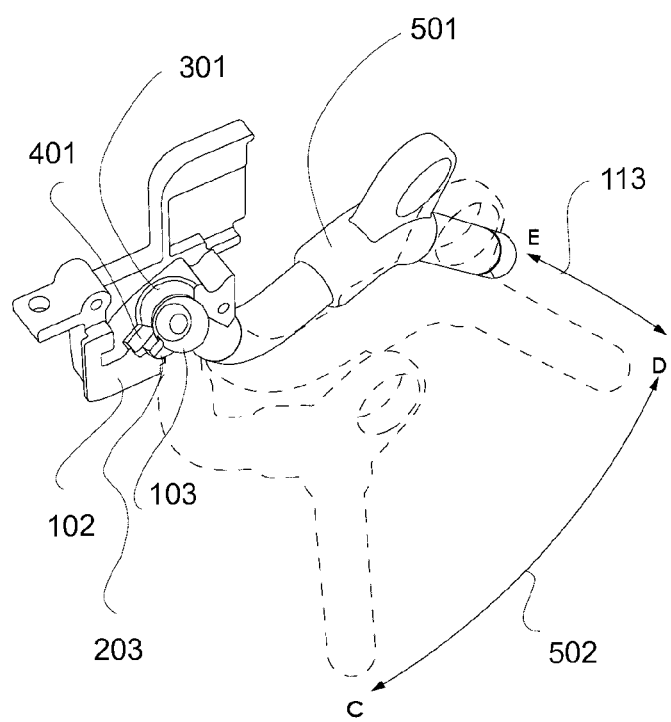
FIG. 5 is a perspective view, partially sectioned illustrating the movement of a steam wand having a ball, fin and slot arrangement.

As suggested by FIGS. 3, 4 and 5, the support fixture 102 includes a socket 301 for retaining the wand's ball 103. As suggested by FIG. 3(a), in the home position, the ball's fin 203 is retained by a radially extending slot 302 that extends away from the socket 301. Because the ball's fin 203 is retained by the slot 302, the ball and therefore the wand 101 is restrained from rotation or side to side motion 113. As shown in FIG. 3(b) when the wand is extended toward its position of use 112, the fin 203 exits the slot 302. This allows the wand 101 to be rotated, also permitting side to side motion 113 as suggested by FIG. 3(c).

The capture of the fin 203 by the slot 302 is also shown in FIG. 4. Note that the wand 101 is, in this example, essentially vertical and therefore restrained in its movement by either or both of the guide 108 and the interaction between the fin 203 and the slot 302. The upper part 401 of the slot may be enlarged to receive the head of a switch actuator 605 as shown in FIG. 6.

As shown in FIG. 5, extending the wand 502 into its position of use 501 frees the fin 203 from the slot 302. It will be appreciated that FIGS. 4 and 5 are partially sectioned allowing the interior of the socket 301 and slot 302, 401 to be better illustrated.

As shown in FIG. 6, the pivoting ball 103 and its locating fin 203 cooperate with a rotating or pivoting switch actuator 601. The switch actuator pivots about a generally horizontal axis 602 and its biased into the lower orientation depicted in FIG. 6 by a torsion spring 603 that preferably surrounds or encircles the pivot axis 602. In the wand's extended position as shown in FIG. 6, the head 604 of the actuator is extended and in contact with the proximate flat surface of the fin 203. An opposite end of the actuator 601 forms a mechanical contact 605. When the wand 101 is returned to the home position as shown in FIG. 7, the actuator 601 rotates, driving the contact 605 into a closing engagement with a switch, such as a micro switch having a flexible of leaf contact 701. When the switch 702 is closed, a signal or switch state 703 is detected by the device's controller or microprocessor control unit 704. The signal 703 (representative of the wand being in the home) position is utilised by the controller 704 to perform one or more of a variety of functions. For example, the controller 704 can use the signal 703 to initiate a purge or cleaning cycle of the wand 705. The controller 704 can also use the location information signal 703 to initiate a display or audible warning from the device's graphic and audio user interface 706. The signal 703 may also be used for other functions 707.

As shown in FIG. 7, the ball 103, and neck 107 have a central passageway 708 that leads into an interior 709 of the wand 101. The hose 711 goes through the passageway into the interior 709. The hose is preferably a non-reactive flexible polymer such as PTFE (Teflon®). The major extent of the wand's body comprises a hollow metal tube 710. The hose 711 carries steam or a steam air mixture through the ball 103, neck 107 and wand 101. The ball's entry opening 712 may be circumferentially tapered or chamfered to reduce torsion stress on the hose 711 and to better accommodate the flexing of the hose 711 when the wand 101 is moved from one position to another.

Figure 8:
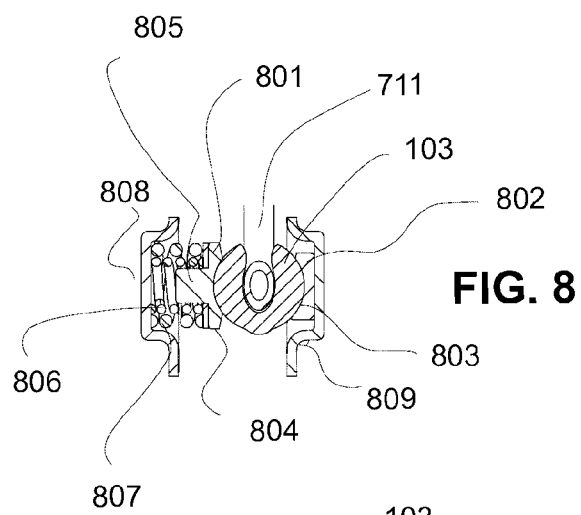
FIG. 8 is a cross sectional view of a steam wand ball and co-operating friction cheeks.

As shown in FIG. 8, in some embodiments, the wand's ball 103 may be frictionally retained by a pair of opposing cheeks 801, 802. Each cheek 801, 802 has a ball engaging concave surface 803. As shown in FIG. 8, one cheek is fixed to a cup 809 and one of the cheeks 804 is carried by a stem 805. The stem 805 is surrounded by a pair of nested or concentric compression springs 806, 807. In this example, two springs 806, 807 are provided to increase the force against the ball 103. The cross sectional diameter or gauge of the inner spring 806 is preferably smaller than the cross sectional diameter of the outer spring 807. The cheek and spring assembly shown in FIG. 8 is retained by a pair of opposing cups 808, 809. The arrangement of concentric or nested coil springs 806, 807 provides significant force against the ball 103, in a compact space.

Figure 9:
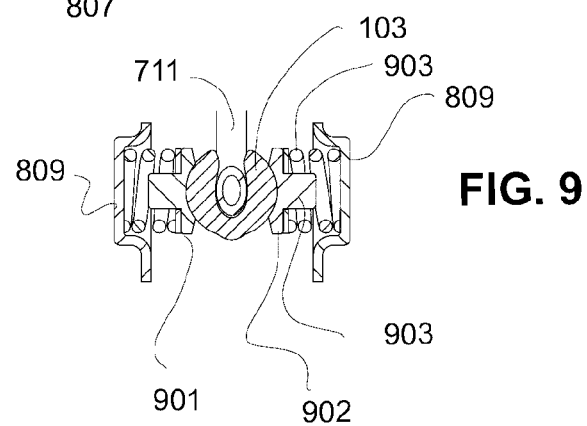
FIG. 9 is a cross sectional view of a steam wand ball and co-operating friction cheeks.

In the example of FIG. 9, the wand's ball 103 is engaged by two similar cheeks 901, 902. Each cheek has a stem 903 that extends toward its respective retainer or cup 908 and each stem is surrounded by a single compression spring 903.

Figure 10:
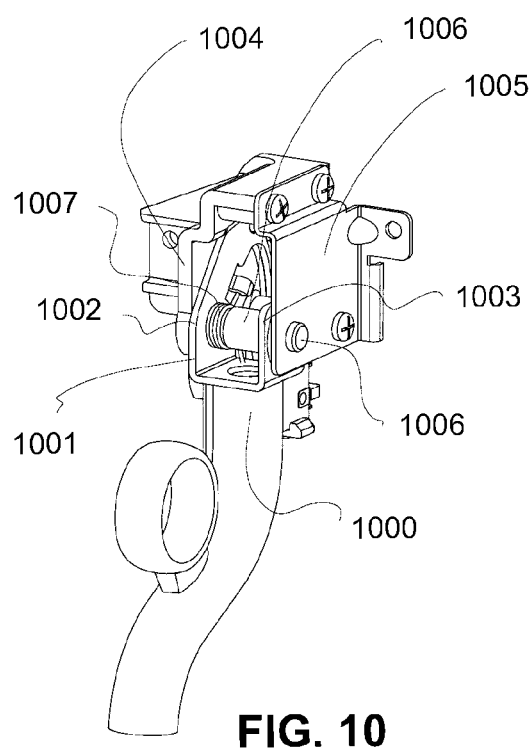
FIG. 10 is a perspective view of another embodiment of a steam wand having a pivoting bracket and torsion spring or coil.

As shown in FIG. 10, in some embodiments, an upper end of the wand 1000 is affixed to a pivoting bracket 1001 instead of a ball. The bracket 1001 has parallel and spaced apart sides 1002, 1003. The sides 1002, 1003 are pivotally retained by parallel walls of the retaining fixture 1004, 1005. A pivot shaft 1006 extends between the side walls 1004, 1005 and carries the sides 1002, 1003. A coil or torsion spring 1007 wraps around the shaft 1006 and is used to bias the bracket and its wand 1000 into the home position.

Figure 11:
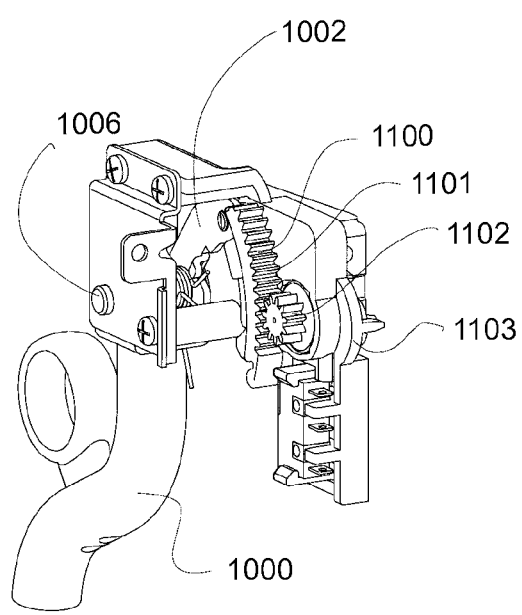
FIG. 11 is a perspective view of the device depicted in FIG. 10 illustrating the use of a dampener in conjunction with a torsion spring.

As shown in FIG. 11, one side 1002 of the bracket 1001 extends toward and affixes to or comprises an arcuate gear section 1100. Accordingly, the gear section 1100 rotates in unison with the bracket about the pivot shaft 1006. The gear teeth 1101 of the gear section engage a cooperating pinion 1102 carried by a rotary dampener 1103. The dampener 1103 is stationery. The dampener 1103 moderates the velocity of the wand 1000, particularly toward the home position under the influence of the torsion spring 1007.

Figure 12:
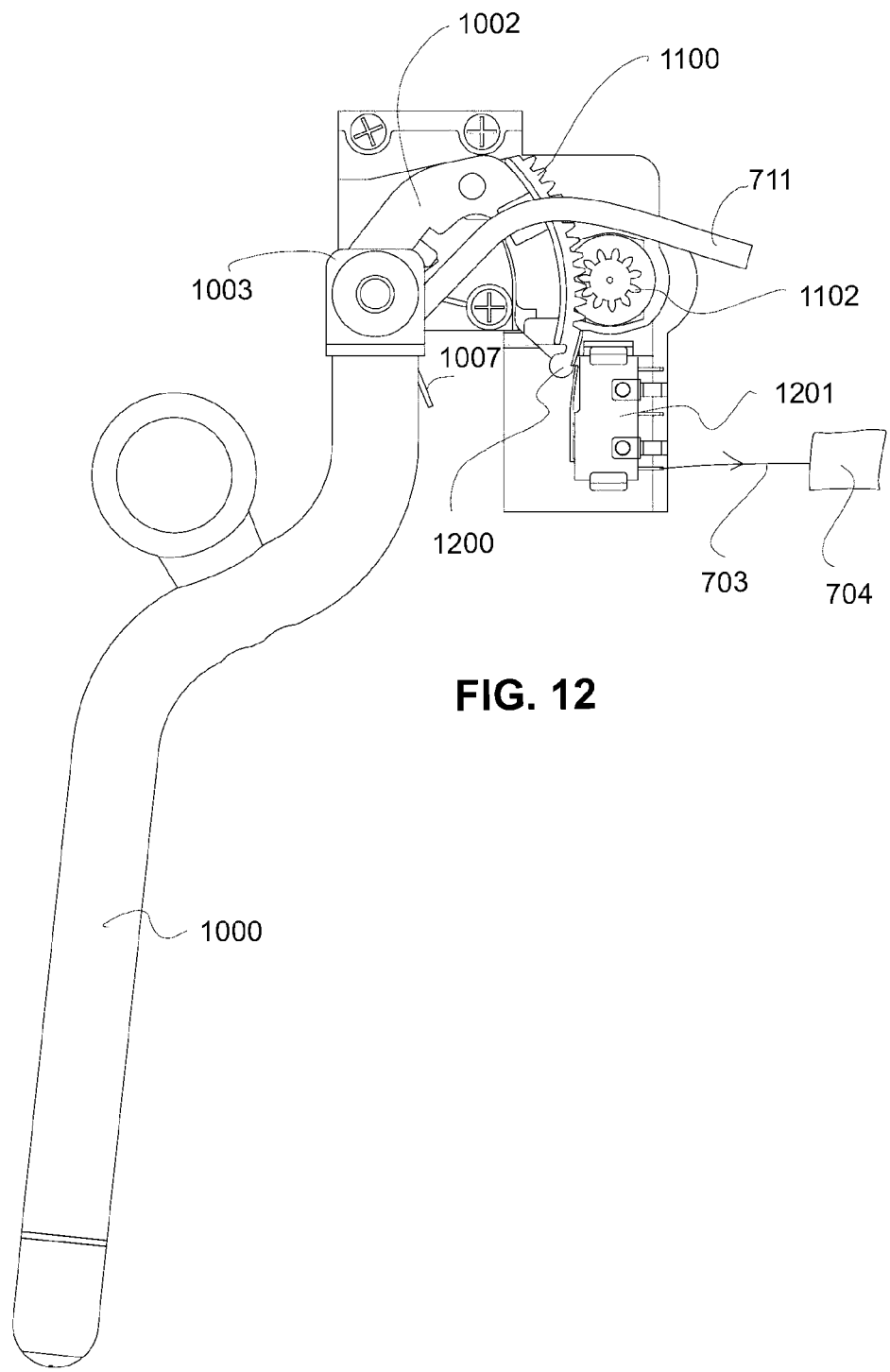
FIG. 12 is a side elevation of the steam wand and dampener depicted in FIG. 11.

As shown in FIG. 12, the arcuate gear section 1100 terminates, at one end, with and actuates a switch actuator portion 1200. The switch actuator portion of the gear section makes contact with a switch such as a micro switch 1201 when the wand 1000 is in the home position. In other positions, the actuator portion 1200 of the gear section 1100 does not contact the switch 1201. In this way, the home position is associated with (for example) the closure of the switch 1201, which closure can be detected by the devices' controller and utilised in the manner suggested by FIG. 7.

Figure 13:
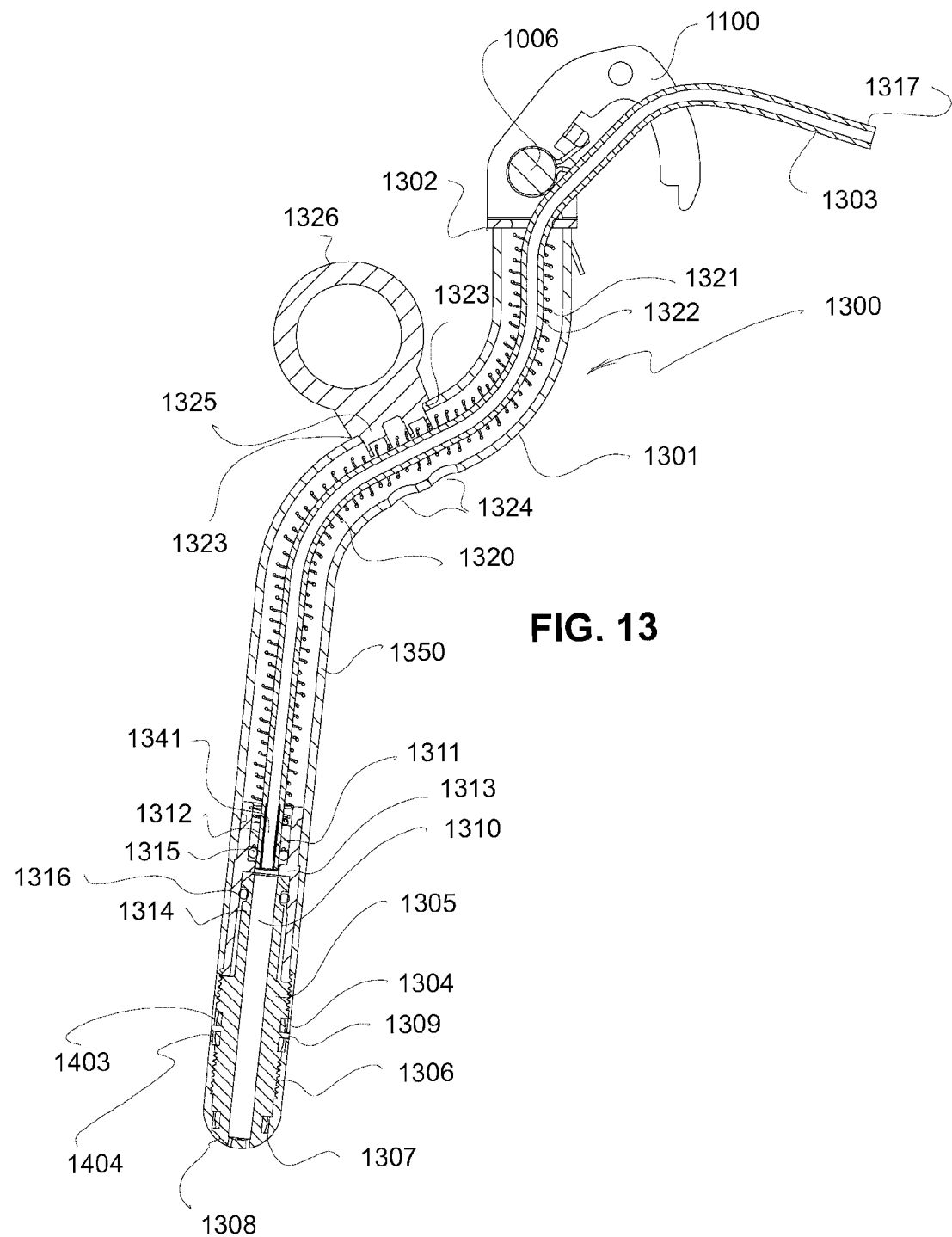
FIG. 13 is a cross sectional view of the steam wand depicted in FIG. 12 illustrating an insulating spring.
Figure 14:
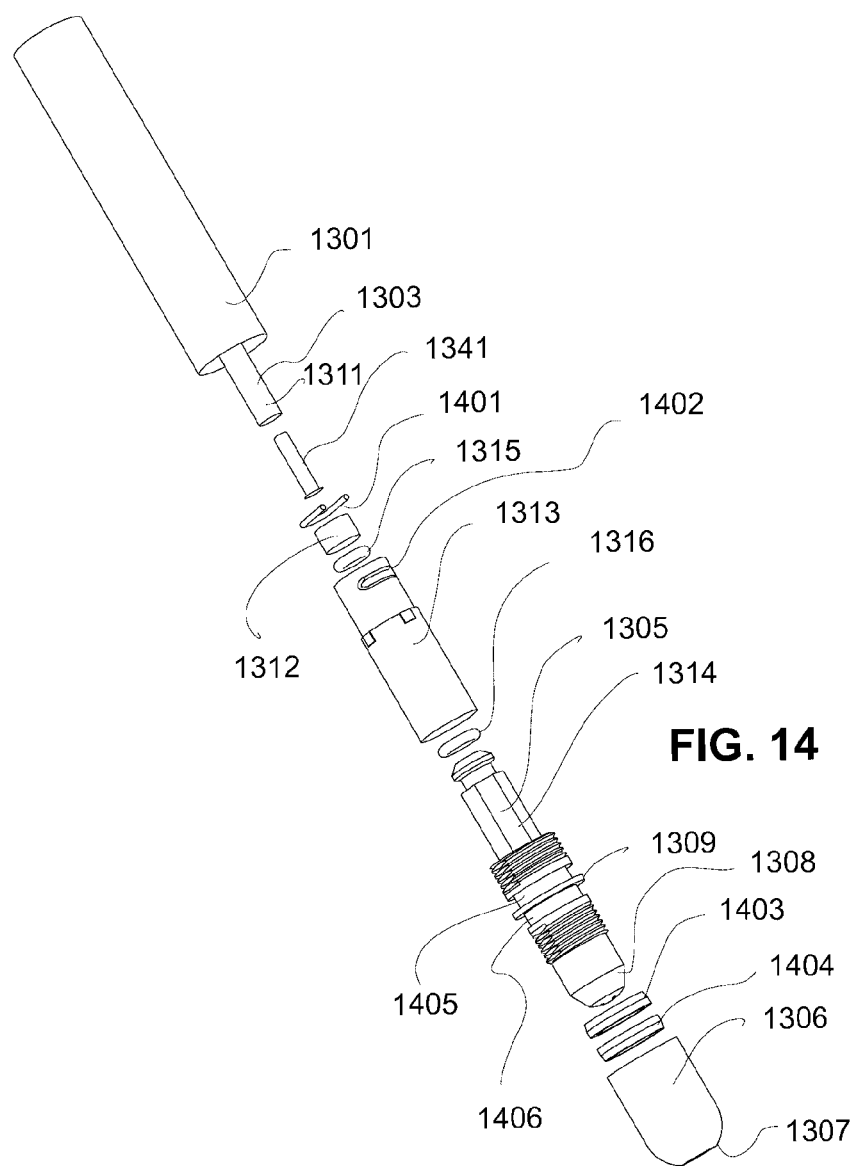
FIG. 14 is an exploded perspective view of the lower end of a steam wand, showing its steam nozzle and tip.
Figure 15:
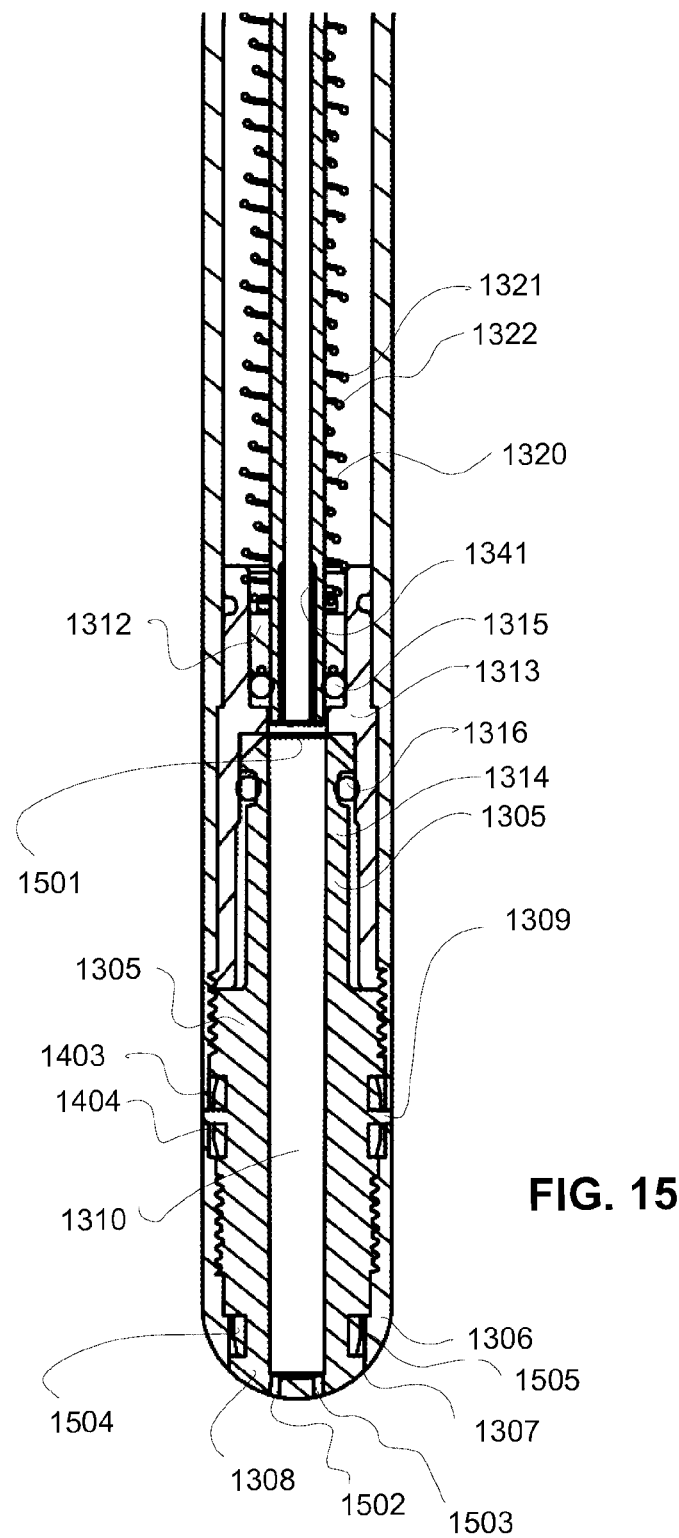
FIG. 15 is a cross sectional view of the lower end of a steam wand, nozzle and steam wand tip.

FIGS. 13, 14 and 15 illustrate an exemplary embodiment of a steam wand construction. As shown in FIG. 13, a steam wand 1300 has a main body tube 1301, and is bent in two locations, for ease of use. The tube is formed in sections preferably constructed from stainless steel. Here, one section is the primary tube 1350 and the tip section 1306. The upper end of the tube 1301 is affixed to (for example) a bracket or ball as previously described. The upper end 1302 of the main body 1301 admits a steam hose 1303, preferably a non-reactive flexible polymer such as PTFE. The polymer forms a first insulation between the steam and the tube 1301. The lower end 1304 of the main body tube 1301 is internally threaded and thereby affixed to co-operating threads or otherwise fitted to the exterior of a polymeric (for example PTFE) steam nozzle 1305. A lower end of the steam nozzle is also externally threaded so as to receive the co-operating internal threads of a metallic steam wand tip 1306. In other embodiments, the main body tube 1301 is flexible. The wand tip has an exit opening 1307 through which protrudes the lower end 1308 of the steam nozzle 1305. The steam nozzle has an optional circumferential flange 1309 that separates the lower end of the main body tube from the upper end of the tip 1306. The steam nozzle 1305 has a central bore 1310 with an uppermost inlet that communicates with the lower end of the hose 1303. The lower end 1311 of the hose 1303 is compressed or stabilised against the interior of the tip connector component by an internal and hollow rivet 1341 that fits into the lower end of the hose. The lower end of the hose is encircled by a tip connector 1312 that is carried within a recess in the upper part of a hose connector 1313. The lower part of the hose connector 1313 forms a bore that receives the upper part 1314 of the steam nozzle 1305. A seal 1315 is interposed between the hose connector 1312 and the tip connector 1312. A second seal 1316 is interposed between the upper part of the steam nozzle 1314 and the lower bore of the tip connector.

Thus, the hose 1303 extends from close to the upper opening of the steam nozzle 1305 to a location 1317 external to the wand 1301. The hose 1303 passes through an insulation spring or coil 1320 forming an elongated spacer within the wand body 1301. In this example, the spacer or coil 1320 is continuous, having a generally constant pitch.

The hose has an extent outside the want and an extent internal to the want or its tube 1301. For the purpose of preventing contact between the hose and the metallic tube, various second insulations are proposed. These insulations are elongated spacers and capable of protecting the fill (or any portion) of the internal extent of the hose. In the example of FIG. 13, the second insulator is in the form of a non-metallic coil, helix or spring. The effective outside diameter of the spacer 1320 alternates between each turn of the coil. Turns of a larger diameter 1321 alternate with turns of a smaller diameter 1322. The larger diameter turns 1321 make contact, as required, with the interior of the main body tube 1301. The smaller diameter turns 1322 make contact with the outside of the hose 1303. In this way, the hose is prevented from making direct contact with the interior of the primary tube 1350 and thereby losing heat to it.

In the example of FIG. 13, the primary tube has two pairs of opposing through openings 1323, 1324. One of the pairs 1323 is used to receive integral rivets 1325 that form a terminal end of a handle such a ring-like handle 1326 fabricated from stainless steel or other metal. The rivets 1325 are deformed by a tool that is inserted through the opposing through openings 1324. Other methods of providing a handle may be used.

As shown in FIG. 14, a "C" clip or other retainer 1401 is accessible through an opening or slot 1402 in the hose connector 1310 prevents the inadvertent withdrawal of the tip connector 1312. Also shown are the nozzle seals 1403, 1404 that are carried by the grooves 1405, 1406 on the upper and lower sides of the external flange 1309. The upper seal 1403 seals the lower end of the main body tube against the steam nozzle 1305 and the lower seal 1404 seals the upper end of the wand tip 1306 against the steam nozzle 1305.

As shown in FIG. 15, there is a small gap 1501 located between the lower extremity of the tube 1303 and the adjacent upper extremity and bore 1310 of the steam nozzle 1305. The lower end of the steam nozzle is also shown as having one or more discharge openings 1502, 1503, as required. The lower end of the steam nozzle may also have a groove for carrying a terminal seal 1504 that seals against an inside diameter or surface 1505 of the steam wand tip 1306.

Figure 16:
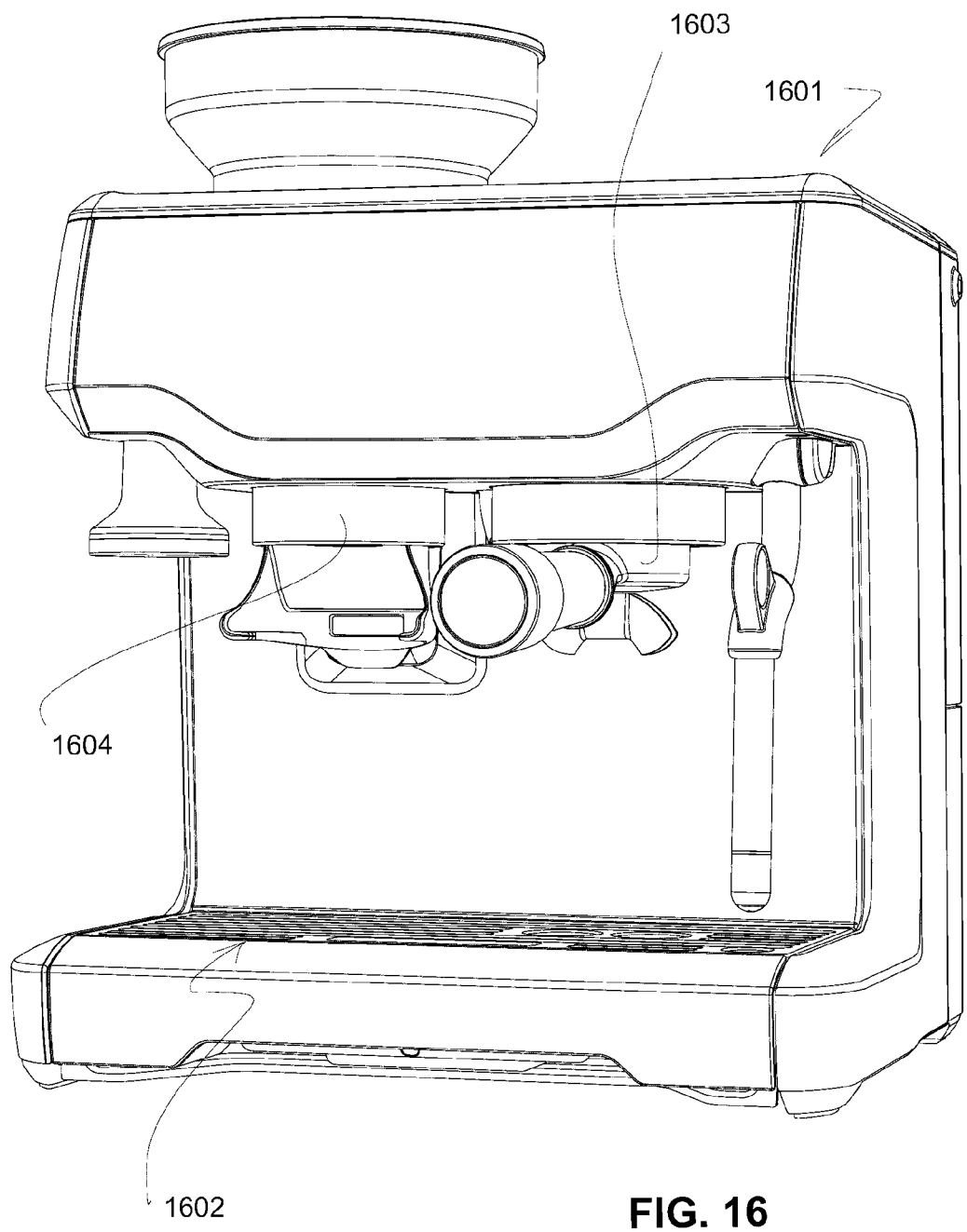
FIG. 16 is a perspective view of an espresso machine having a steam wand assembly.

As shown in FIG. 16, an espresso making machine 1601 has a platform or drip tray 1602 that is located below the device's group head 1603 and optional coffee grinder outlet 1604. In preferred embodiments, the steam wand is operable in the lower most or home position illustrated in FIG. 16. In other embodiments, the wand may be disabled when it is in the lower most or home position as shown in FIG. 16.

Figure 17:
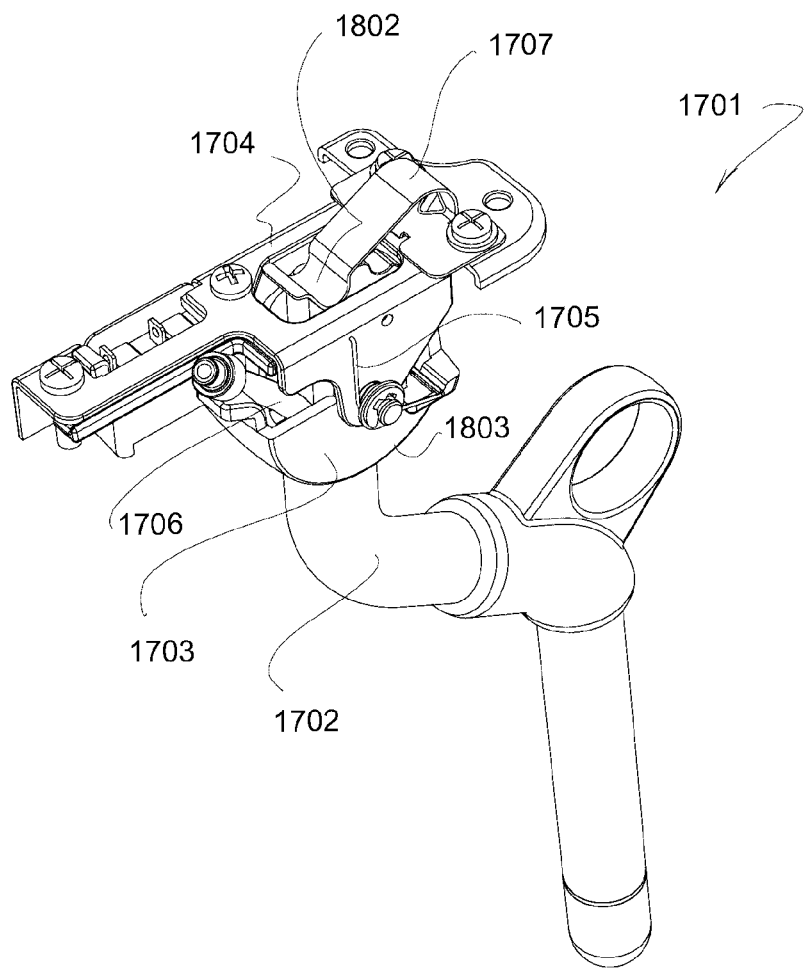
FIG. 17 is a rear perspective view of a steam wand assembly of the type depicted in FIG. 16.

As shown in FIG. 17, a steam wand assembly 1701 has a steam wand 1702 that is carried by a wand pivot 1703. The wand pivots 1703 is carried by and pivots about a pivot bracket 1704. A torsion spring or other bias device 1705 is attached to the pivot bracket 1704 and urges the wand pivot 1703 and therefore the wand 1702 toward the home position depicted in FIG. 16. The flexible polymeric steam tube 1706 passes between the pivot bracket 1704 and the wand pivot 1703.

Figure 18:
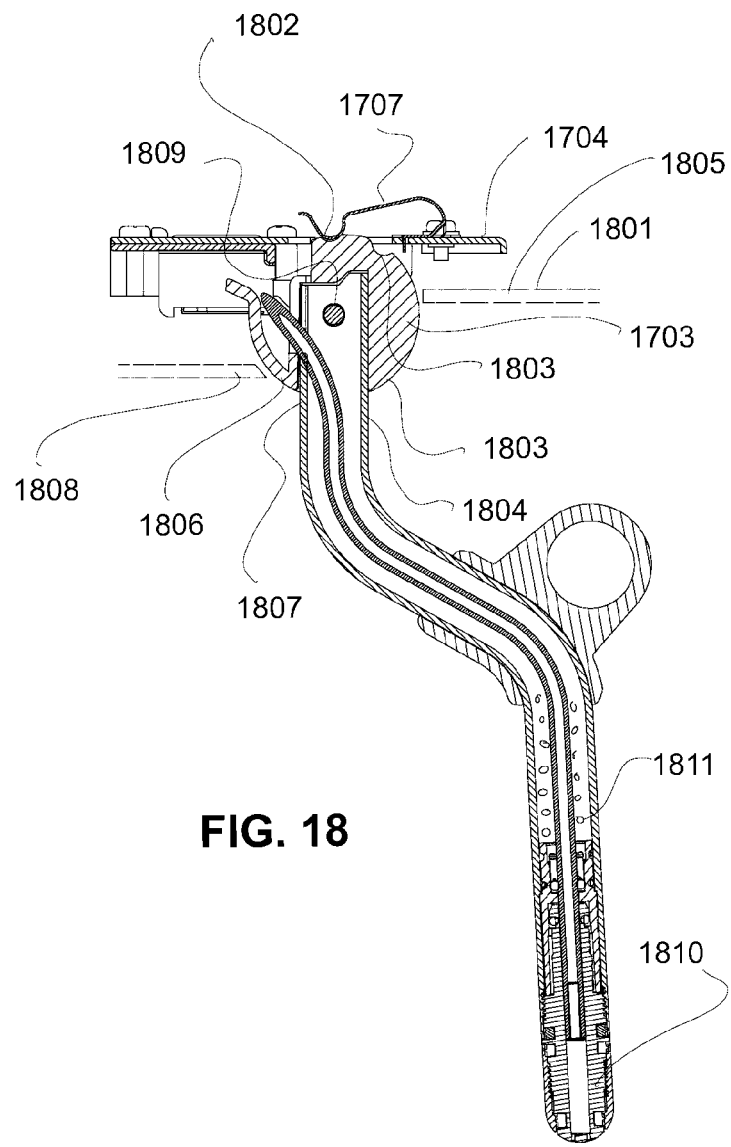
FIG. 18 is a cross-sectional view of the steam wand assembly depicted in FIG. 17.

As suggested by FIGS. 17 and 18 the pivot bracket 1704 is rigidly affixable to the chassis or a chassis component of the device 1601. In this example, the pivot bracket 1704 carries a leaf spring 1707 having a radius or rounded tip 1802. The tip is received by one or more detents located on the periphery of a smooth external surface 1803 of the wand pivot 1703. The rounded portion of the wand pivot 1803 extends from a front surface 1804 of the wand so as to occupy the gap between the front of the wand 1804 and an adjacent external part of the chassis 1805. A similarly rounded portion of the wand pivot 1806 extends from the rear surface of the wand 1807 toward and past an adjacent rearward edge of the chassis 1808. The rounded portions 1806, 1803 occupy the forward and rear gaps around the wand pivot so that a finger is not trapped or pinched between the wand and the chassis when the wand is pivoting. In the example of FIG. 18, the pivot point of the wand 1809 passes through a centre of the wand pivot. The lateral sides of the wand pivot are flat and generally parallel. The co-operation between the leaf spring 1707 and the detents 1803 allow the wand to assume one, two or more stable orientations. Other aspects of the wand including the construction of the insulating tip 1810 and insulating spring 1811 are similar to those previously disclosed.

Figure 19:
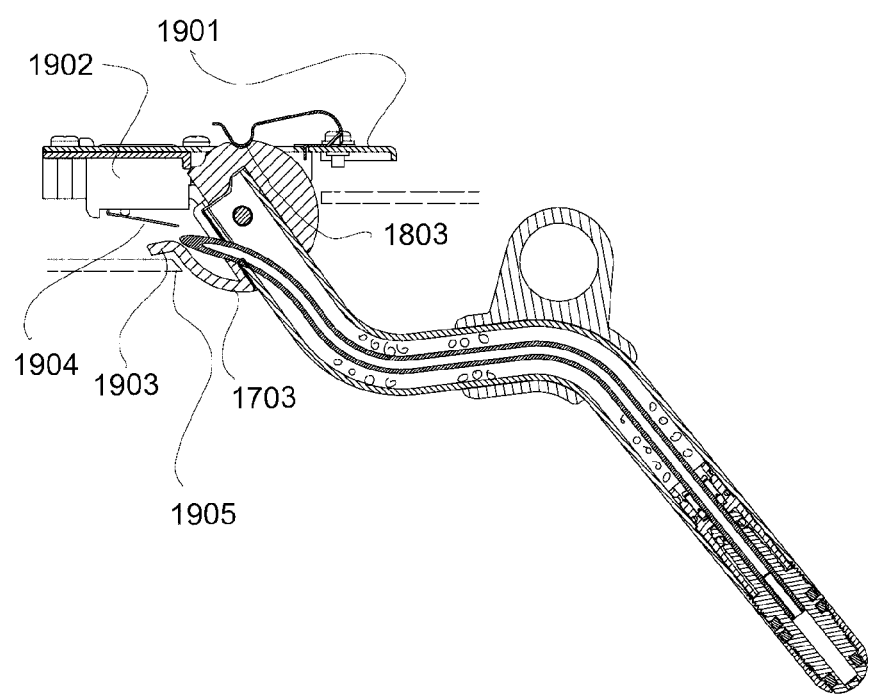
FIG. 19 is a cross-sectional view of the steam wand assembly depicted in FIG. 17, in an extended position.

As shown in FIG. 19, the pivot bracket 1901 may carry a sensor, switch or micro switch 1902 that is used to provide wand position information to the device's processor 1607. In this example, a rearward extension of the wand pivot 1903 makes contact with the switch or its actuator 1904 when the wand is in the home position, but not when it is in the extended position depicted in FIG. 19. Note that in this example, the extended position is defined by the location of the leaf spring in the detent 1803. The rearward extension 1903 of the wand pivot 1703 may also be used as a limit to the forward extension of the wand, by abutting and interfering with a part of the chassis 1905 adjacent to the wand pivot and located behind the wand.

Figure 20:
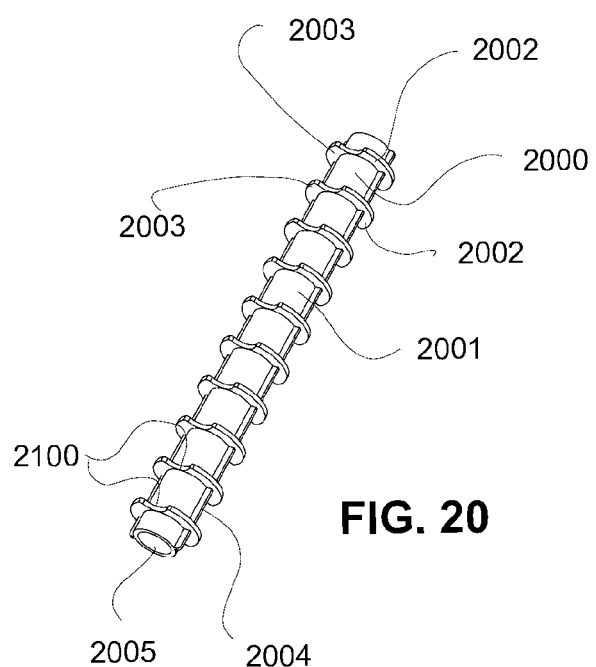
FIG. 20 is a perspective view of an insulating sleeve for a steam wand.
Figure 21:
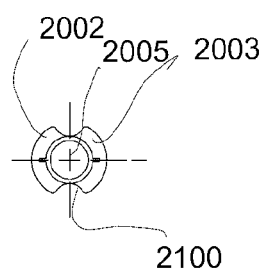
FIG. 21 is a cross-sectional view of the sleeve of FIG. 20.
Figure 22:
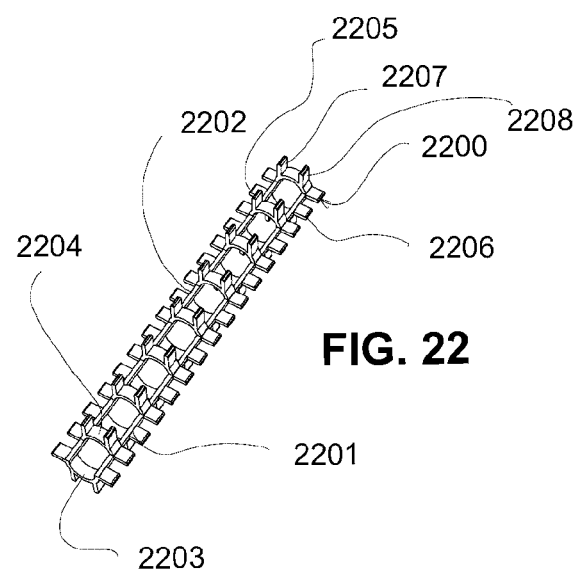
FIG. 22 is another embodiment of an insulating sleeve for a steam wand.

As shown in FIG. 20, the coil depicted, for example in FIGS. 13, 15, 18 and 19 can be formed from a flexible and heat resisted polymer as shown in FIGS. 20 and 21. In the examples of FIGS. 20-22, the sleeve 2000 is intended to be used within a wand for the purpose of inhibiting contact between the tube carrying steam and the inner wall of the tube 1301. The sleeve 2000 in this example, comprises a tube 2001 having various projections, spacers or tabs 2002 along its length. In this example, the projections 2002 are provided in pairs 2002, 2003. Pairs are spaced apart from one another along the length of the tube. Each projection or wing comprises a rounded or a smooth exterior. As shown in FIG. 21, the projections in each pair 2002, 2003 are separated from one another by an arch shaped notch 2100. As suggested by FIG. 20, the tube may have one or more longitudinal ribs 2004 extending along all or part of the length of the tube. The tube has a central opening 2005 for receiving the steam tube.

As shown in FIG. 22, a sleeve 2200 may also comprise a skeletal tube having, for example, a pair of longitudinal ribs 2201, 2202. The two ribs 2201, 2202 are parallel and spaced apart. The two ribs are interconnected by arches that alternate along the length of the ribs. Alternating arches 2203, 2204 are spaced apart and located along the length of the ribs. The two ribs 2201, 2202 define a plane. Arches 2203 on one side of the plane extend downwardly or in one direction and arches 2204 on the other side of the plane extend upwardly or in the other direction. Each arch is associated with a pair of lateral extension tabs 2205, 2206. Each arch is also associated with a pair of parallel and spaced apart fingers 2207, 2208, the fingers extending away from the arch in the same direction as the arch extends away from the parallel ribs. In the example of FIG. 22, the arches (extending in either direction from the ribs) are evenly spaced from one another and alternating.

Although the invention has been described with reference to specific examples, it will be appreciated by those skilled in the art that the invention may be embodied in many other forms.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Unless specifically stated otherwise, as apparent from the following discussions, it is appreciated that throughout the specification discussions utilizing terms such as "processing," "computing," "calculating," "determining" or the like, refer to the action and/or processes of a microprocessor, controller or computing system, or similar electronic computing or signal processing device, that manipulates and/or transforms data.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the scope of the invention, and it is intended to claim all such changes and modifications as fall within the scope of the invention.

While the present invention has been disclosed with reference to particular details of construction, these should be understood as having been provided by way of example and not as limitations to the scope of the invention.

The invention claimed is:

1. A steam wand device for a beverage maker, comprising:
a metallic body tube;
the tube having a steam hose within it;
the hose that is within the tube passing through an elongated, flexible coil that inhibits the hose from contacting an interior of the tube.

2. The device of claim 1, wherein;
the coil has a plurality of turns of a larger diameter that alternate with turns of a small diameter.

3. The device of claim 2, wherein the turns of the larger diameter are spaced from an interior of the tube when the tube and hose are coaxial.

4. The device of claim 1, wherein:
the coil has a constant pitch.

5. The device of claim 1, wherein:
the tube is bent.

6. The device of claim 1, wherein:
a lower end of the hose is encircled by a tip connector that compresses the lower end of the hose.

7. The device of claim 1, wherein the coil inhibits the hose from contacting the interior of the tube only as required.

8. A steam wand device for a beverage maker, comprising:
a metallic body tube;
the tube having a steam hose within it;
the hose that is within the tube passing through an elongated, flexible coil that inhibits the hose from contacting an interior of the tube;
wherein, the coil is formed of a plurality of first turns and a plurality of second turns, wherein an effective outer diameter of the first turns is greater than an effective outer diameter of the second turns, and wherein the effective outer diameter of the first turns is less than the interior of the tube.

9. The device of claim 8, wherein the second turns are sized to contact with an exterior of the hose.

* * * * *